(12) United States Patent
Li et al.

(10) Patent No.: US 7,474,508 B1
(45) Date of Patent: Jan. 6, 2009

(54) HEAD GIMBAL ASSEMBLY WITH AIR BEARING SLIDER CROWN HAVING REDUCED TEMPERATURE SENSITIVITY

(75) Inventors: Weijin Li, El Dorado Hills, CA (US); Martin J. McCaslin, Pleasanton, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 349 days.

(21) Appl. No.: 11/076,335

(22) Filed: Mar. 9, 2005
(Under 37 CFR 1.47)

(51) Int. Cl.
*G11B 5/48* (2006.01)
(52) U.S. Cl. ................................. 360/245.2
(58) Field of Classification Search ........... 360/240, 360/244, 244.2, 245, 245.2, 245.3, 245.4
See application file for complete search history.

(56) References Cited

U.S. PATENT DOCUMENTS

| H1424 H | * | 4/1995 | Budde ................. 29/81.03 |
| 5,467,236 A | | 11/1995 | Hatanai et al. |
| 5,499,153 A | * | 3/1996 | Uemura et al. ......... 360/234.6 |
| 5,608,590 A | * | 3/1997 | Ziegler et al. ......... 360/245.5 |
| 5,774,305 A | * | 6/1998 | Boutaghou ............ 360/245.4 |
| 5,786,964 A | * | 7/1998 | Sone et al. ............ 360/234.5 |
| 5,844,751 A | * | 12/1998 | Bennin et al. .......... 360/244.3 |
| 5,880,908 A | | 3/1999 | Shiraishi et al. |
| 6,282,063 B1 | * | 8/2001 | Coon .................. 360/245.3 |
| 6,385,011 B1 | | 5/2002 | Chang et al. |
| 6,397,455 B1 | * | 6/2002 | Hagen ................. 29/603.03 |
| 6,700,746 B1 | * | 3/2004 | Brandt et al. ........... 360/245.4 |
| 6,801,398 B1 | | 10/2004 | Ohwe et al. |
| 6,940,694 B2 | | 9/2005 | Ohwe et al. |
| 7,095,590 B2 | * | 8/2006 | Motonishi et al. ....... 360/234.6 |
| 2005/0002125 A1 | | 1/2005 | Ohwe et al. |

FOREIGN PATENT DOCUMENTS

| JP | 04305877 A | 10/1992 |
| JP | 05109038 A | 4/1993 |
| JP | 07065525 A | 3/1995 |
| JP | 07320435 A | 12/1995 |

\* cited by examiner

*Primary Examiner*—Angel A. Castro

(57) ABSTRACT

A head gimbal assembly includes a slider and novel gimbal that may reduce crown sensitivity to temperature without substantially sacrificing the ability of a bond between the gimbal tongue and slider to resist applied forces and torques. The gimbal has a tongue that includes at least one weakening region. The weakening region extends more in a direction perpendicular to the length of the slider than it does in a direction parallel to the length of the slider. A bonding surface of the slider is attached to the tongue in a first bonding region that extends closer to a leading end of the slider than the weakening region does, and in a second bonding region that extends closer to a trailing end of the slider than the weakening region does. The gimbal can be used in a head gimbal assembly of a magnetic hard disk drive or other information storage device.

6 Claims, 5 Drawing Sheets

HEAD GIMBAL ASSEMBLY WITH AIR BEARING SLIDER CROWN HAVING REDUCED TEMPERATURE SENSITIVITY

BACKGROUND OF THE INVENTION

1. Field of the Invention

The present invention relates generally to the field of information storage devices, and more particularly to the manufacture of gimbals that brace air bearing sliders in such devices.

2. Description of the Prior Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that can not write.

FIG. 1 illustrates a typical magnetic hard disk drive. The disk drive includes a head disk assembly (HDA) 10 and a printed circuit board assembly (PCBA) 11. The head disk assembly 10 includes a disk drive base 12 and a cover 14 that collectively house at least one magnetic disk 16. The disk 16 contains a plurality of magnetic tracks for storing data. The tracks are typically disposed upon opposing first and second disk surfaces 18, 20 of the disk 16 that extend between an inner disk edge 22 (at an inner diameter) and an outer disk edge 24 (at an outer diameter) of the disk 16. The head disk assembly further includes a spindle motor 26 for rotating the disk 16. The spindle motor 26 includes a spindle motor hub that is rotatably attached to the disk drive base 12. The hub has an outer hub flange that supports a lowermost one of the disks. Additional disks may be stacked and separated with annular disk spacers that are disposed about the hub.

The head disk assembly further includes a head stack assembly 28 rotatably attached to the disk drive base 12. The head stack assembly 28 includes at least one head, typically several, for reading and writing data from and to the disk 16. The printed circuit board assembly 11 includes a servo control system for generating servo control signals to position the head stack assembly 28 relative to tracks disposed upon surfaces 18, 20 of disk 16.

In a magnetic hard disk drive, the head typically comprises a body called a "slider" 42, 44 that carries a magnetic transducer on its trailing end. The magnetic transducer typically includes an inductive writer and a magnetoresistive read element. In a magnetic hard disk drive, the transducer is typically supported in very close proximity to the magnetic disk by a hydrodynamic air bearing. As the motor 26 rotates the magnetic disk 16, the hydrodynamic air bearing is formed between an air bearing surface of the slider 42, 44 and a surface 18, 20 of the magnetic disk 16.

The head stack assembly 28 includes a rotatable actuator 30. In FIG. 1, the actuator 30 includes an actuator body 32 and actuator arms 34, 36 that extend from the actuator body 32. Distally attached to the actuator arms 34, 36 are head gimbal assemblies 38, 40. The head gimbal assemblies 38, 40 respectively brace sliders 42, 44. It is contemplated that the number of actuator arms may vary depending upon the number of disks and disk surfaces utilized.

The actuator body 32 includes a bore, and the actuator 30 further includes a pivot bearing cartridge 46 engaged within the bore for facilitating the actuator body 32 to rotate about an axis of rotation 48. The actuator 30 further includes a coil support 50 that extends from one side of the actuator body 32 opposite the actuator arms 34, 36. The coil support 50 is configured to support a coil 52. A pair of magnets 54, 56 is supported by mounts 58, 60 which are attached to the disk drive base 12 (magnet 56 is indicated by the dashed lead line and it is understood that the magnet 56 is disposed underneath the mount 60). The magnets 54, 56 may be attached to the disk drive base 12 through other arrangements, such as the magnet 56 being directly mounted to the cover 12 which is mechanically engaged with the disk drive base 12. The coil 52 interacts with the magnets 54, 56 to form a voice coil motor for controllably rotating the actuator 30.

Now referring to FIG. 2, a typical HGA 38 in a magnetic hard disk drive includes a load beam 51, a gimbal 65 attached to a distal end 55 of the load beam 51, a slider 42 attached to the gimbal 65, a swage mount (not shown in FIG. 2) attached typically by spot welding to a proximate end 53 of the load beam 51, and an electrical connection of the transducer to other circuitry (e.g. a pre-amplifier) in the disk drive. The swage mount is used to attach the proximate end 53 of the load beam 51 to the actuator arm 34, typically by means of plastic deformation of a cylindrical flange that protrudes from the swage mount in alignment with hole 57. The load beam has bend areas 59 that serve a spring function that provides a preload force, also known as the "gram load," that forces the air bearing surface of the slider 42 towards the surface 18 of the spinning disk 16. Stiffening ribs 61 can be used to practically confine the bending required to provide the "gram load" to the bend areas 59. The load beam 51 and gimbal 65 also serve a multi-degree-of-freedom hinge function that permits the slider 42 to follow the contour of the surface 18 of the spinning disk 16.

The electrical connection (not shown in FIG. 2) of the transducer to other circuitry (e.g. pre-amplifier) typically includes conductive traces laid on a dielectric layer such as a polyimide film formed on the head gimbal assembly. The dielectric layer electrically insulates the conductive traces, which may be formed of copper for example, from the gimbal, which may be formed of stainless steel for example. There are typically four or more conductive traces required for the operation of the read/write transducer. The conductive traces are electrically connected to the transducer at a trailing end of the slider. Such conductive traces are typically formed upon the dielectric layer through a deposition and/or etching process. The conductive traces include terminal pads which are disposed adjacent the slider. Various electrical connection techniques may be used to connect the terminal pads to the slider, such as gold ball bonding or wire bonding.

The slider 42 is typically adhesively bonded to the gimbal 65 using structural and conductive epoxies. The structural epoxy is used to adhere a bonding surface of the slider 42 to a tongue feature of the gimbal 65. The conductive epoxy (such as silver-doped epoxy) is typically applied to provide an electrical ground path to the slider 42 through the actuator 30, load beam 51, and gimbal 65, from the disk drive base 12.

A magnetic hard disk drive as described in the paragraphs above, however, is not the only type of information storage device that has utilized air bearing sliders. For example, air bearing sliders have also been used in the HGAs of optical information storage devices to position an objective lens over non-magnetic media for optical read-back of data. In any case, the purpose of the gimbal is to allow the air bearing slider to pivot so that its air bearing surface can closely comply with the plane of the spinning disk surface.

The thickness of the air bearing, and therefore the spacing between the transducer or objective lens and the disk surface, depends in part on the longitudinal out-of-plane curvature of the air bearing surface, commonly known as the "crown" of the air bearing surface. Since the air bearing thickness (also known as "flying height") is a design parameter that affects the performance of an information storage device, it is desirable that the crown of the slider be tightly controlled. Consequently, when a head comprising a slider and transducer or comprising a slider and objective lens is bonded to a gimbal, creating an assembly herein referred to as an HGA, it is desirable that the assembly does not render the slider's crown to be excessively sensitive to environmental conditions such as temperature.

Typically a different material is used for the slider than is used for the gimbal to which the slider is bonded, and those different materials have different coefficients of thermal expansion. For example, often the slider is fabricated from a ceramic material such as AlTiC whereas the gimbal is fabricated from a metal such as stainless steel. Therefore, a temperature induced stress can be imparted to the slider by the gimbal when the environmental temperature changes. The temperature induced stress, in turn, can change the slider's crown and consequently alter the slider's flying height. Since information storage devices typically must operate at any temperature within a specified range of temperatures, it is undesirable for slider crown to be too sensitive to changes in temperature.

Attempts to render the slider crown less sensitive to changes in temperature have been made in the past. For example, in Japanese patent application number 07063757 published on Dec. 8, 1995, Makoto et al. suggested a combination of materials to be used for the gimbal and slider that would provide some advantageous relationship between the coefficient of thermal expansion of the gimbal material relative to the coefficient of thermal expansion of the slider material. Another example of this approach can be found in Japanese patent application number 05210228 to Kotaro et al., published on Mar. 10, 1995.

However, the coefficient of thermal expansion matching approach has an important drawback; it constrains, often impractically, the material selection for the slider, or the gimbal, or both. There are many other engineering factors that affect the selection of the best materials for the slider and for the gimbal. Often the slider material is necessarily the same material that is used as the wafer (upon which many thousands of read/write transducers are deposited by photolithographic methods). The material for such a wafer is constrained by many engineering considerations such as surface finish, electrical and magnetic properties, chemical properties, and the various mechanical properties that determine a later ability to precisely dice the wafer into many sliders with acceptable dimensional characteristics and low residual stresses. AlTiC is often a practical material choice for wafers in magnetic hard disk drive applications. The gimbal material must also have material properties that are acceptable for low cost fabrication of many small, thin, clean and non-corrosive gimbals having complex contours that maintain precise dimensions over a population of parts. Stainless steel is often a practical material choice for gimbals in magnetic hard disk drive applications. More exotic materials may not be practical where industry profit margins are traditionally low. Ultimately, there is rarely enough design freedom in the selection of materials to use a coefficient of thermal expansion matching approach to render slider crown insensitive to temperature changes.

An easier problem to solve is to compensate for (or minimize) an undesired change to slider crown caused during assembly, typically immediately after the slider is bonded to the gimbal, due to the shrinkage or expansion of a bonding adhesive as it dries or hardens. This problem is easier to solve because assembly can take place in a controlled environment characterized by known temperatures, and the shrinkage or expansion can be predicted as a function of the adhesive properties (and/or the resulting repeatable change in slider crown can be measured), and then component design or aspects of the assembly process can be changed to compensate for the repeatable change in crown.

Strategies to compensate for or minimize the crown imparted to the slider due to adhesive shrinkage or expansion during assembly have been disclosed in the art. For example, in Japanese patent application number 03297714 published on Apr. 30, 1993, Fujii Naoki disclosed a method to adjust nominal crown shape imparted to a slider when it is bonded to a gimbal. In Japanese patent application number 03070907 published on Oct. 28, 1992, Kuwamoto Yoshino disclosed a slider surface texture characterized by slits that would allow crown to be intentionally adjusted based on adhesive shrinkage. In U.S. Pat. No. 5,467,236, Hatanai and Takahashi disclosed a gimbal tongue having a non-contact portion that obstructs the flow of adhesive when the slider is bonded to the gimbal tongue, thereby confining the adhesive to a limited bonding area and preventing flow of the adhesive towards the transducer carried by the slider. Although this approach may be effective in confining the adhesive that bonds the slider to the gimbal tongue during assembly, it would have an important practical drawback if one were to try to use it as a means to reduce the ultimate temperature sensitivity of slider crown. Reducing the sensitivity of slider crown to external stresses merely by confining the bonding area is an unfavorable engineering tradeoff. Too large a bonding area simply leads to too much crown sensitivity, and too small a bonding area excessively weakens the bond's ability to resist applied forces and torques.

Therefore, what is needed is a gimbal design that reduces slider crown sensitivity to temperature changes, the sensitivity reduction being based on a novel geometry rather than material selection, and where the novel geometry does not substantially sacrifice the ability of the bond between the gimbal tongue and the slider to resist applied forces and torques.

SUMMARY OF THE INVENTION

A head gimbal assembly includes a slider and a gimbal having a tongue that includes at least one weakening region. The weakening region extends more in a direction perpendicular to the length of the slider than it does in a direction parallel to the length of the slider. The weakening region includes a partially etched depression that does not extend completely through the thickness of the tongue. The tongue has a thickness that is less within the partially etched depression than outside of the partially etched depression. The bonding surface is attached to the tongue in a first bonding region that extends closer to a leading end of the slider than the weakening region does, and in a second bonding region that extends closer to a trailing end of the slider than the weakening region does. The gimbal can be used in a head gimbal assembly of a magnetic hard disk drive or other information storage device.

DETAILED DESCRIPTION OF EXEMPLARY EMBODIMENTS

Figure 1:
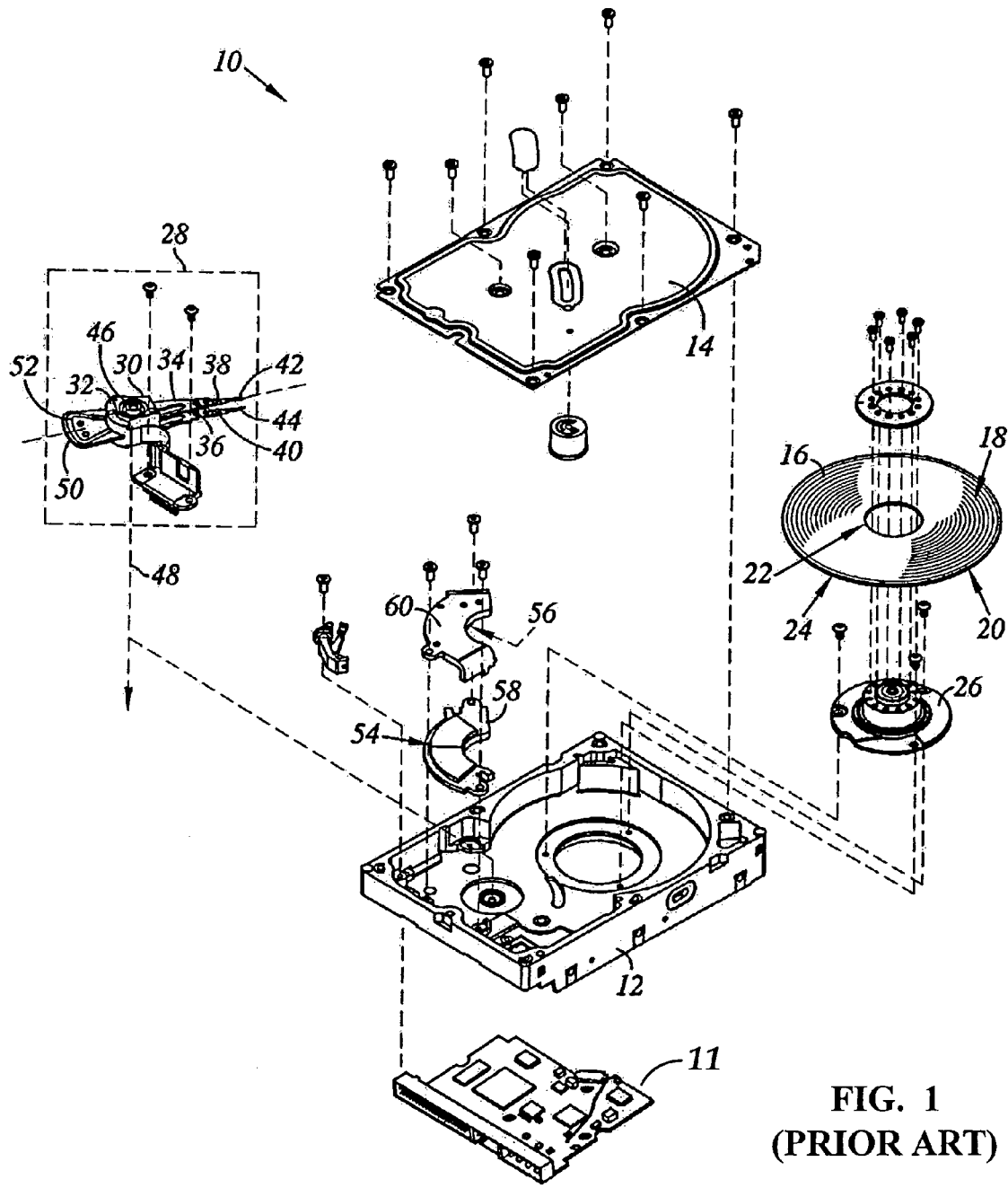
FIG. 1 is an exploded perspective view of a magnetic hard disk drive of the prior art.
Figure 2:
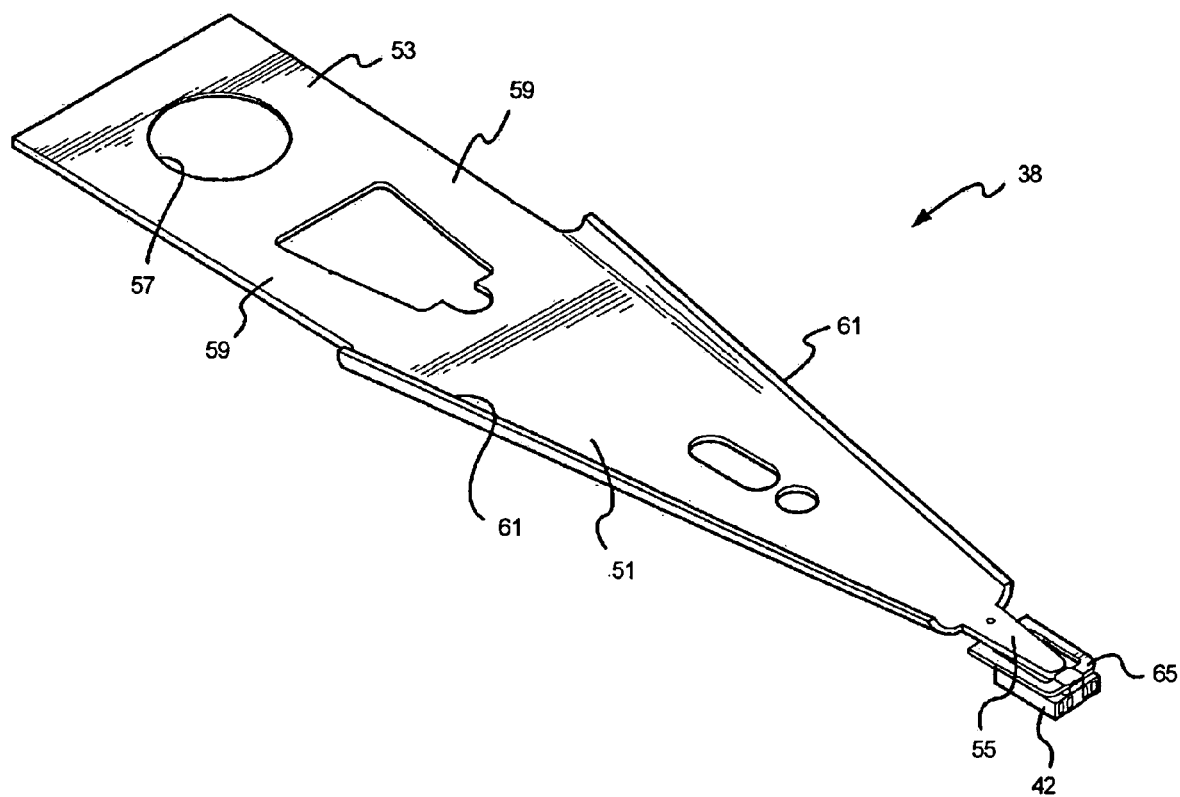
FIG. 2 is a perspective view of a head gimbal assembly of the prior art.
Figure 3:
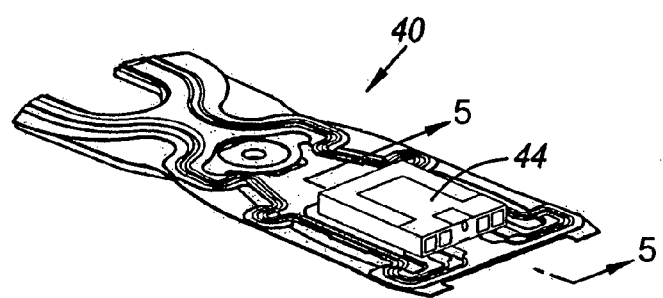
FIG. 3 is an enlarged perspective view of a portion of a head gimbal assembly as constructed in accordance with an embodiment of the present invention.
Figure 4:
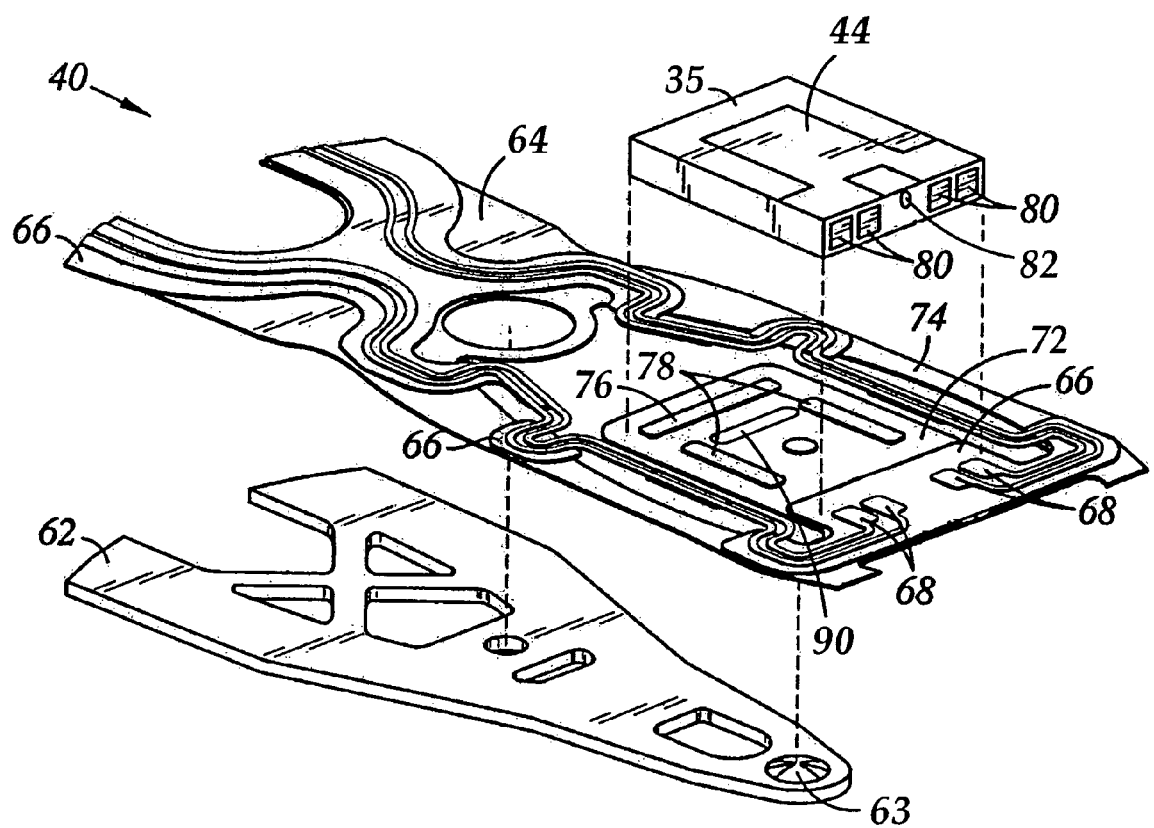
FIG. 4 is an enlarged exploded view of the portion of the head gimbal assembly of FIG. 3.
Figure 5:
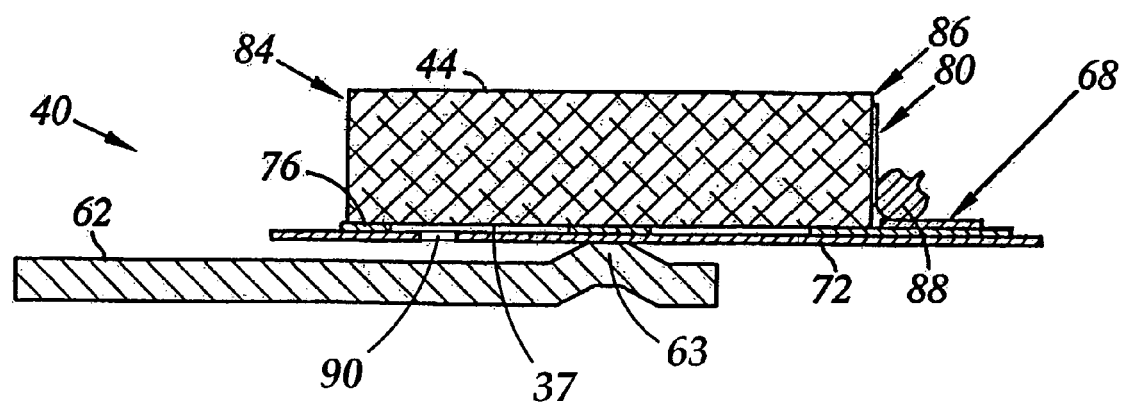
FIG. 5 is an enlarged side view of the portion of the head gimbal assembly of FIG. 3 as seen along axis 5-5, except with electrical connections shown.

FIG. 3 shows an enlarged perspective view of a portion of an exemplary head gimbal assembly 40 constructed in accordance with a preferred exemplary embodiment of the present invention. FIG. 4 is an enlarged exploded view of the portion of the head gimbal assembly 40 of FIG. 3. For ease of discussion, certain electrical connections are not depicted in FIGS. 3 and 4. FIG. 5 is an enlarged side view of the portion of the head gimbal assembly 40 of FIG. 3 as seen along axis 5-5, except FIG. 5 depicts the side view with electrical connections 88 shown.

In the exemplary embodiment of FIGS. 3-5, gimbal 64 includes a gimbal tongue 72, which is supported by compliant outriggers 74 to allow the gimbal tongue 72 to pivot about dimple 63 in load beam 62 during operation. The slider 44 is braced by the gimbal 64 through attachment of a bonding surface 37 of the slider 44 to the gimbal tongue 72. The bonding surface 37 opposes an air bearing surface 35 of slider 44. Accordingly, the slider 44 is disposed upon dielectric layer pads 66, 76 and 78. In bonding regions about the dielectric layer pads 76 and 78, and in an alternative embodiment also the edge region of dielectric layer pad 66 that underlies the slider 44, structural epoxy is used as a bonding agent for secure attachment of the bonding surface 37 of the slider 44 to the gimbal 64.

Opposite the bonding surface 37, the slider 44 includes an air bearing surface 35. The slider 44 also includes a leading end 84 and an opposing trailing end 86 separated by a length. Transducer 82 is disposed on the trailing end 86 of the slider 44, and is electrically connected to electrical connections 80. During HGA assembly, electrical connections 80 are then connected to electrical connections 68 on gimbal 64 via gold balls 88.

The gimbal tongue 72 includes a weakening region 90 that extends more in a direction perpendicular to the length of slider 44 than in a direction parallel to the length of slider 44. The bonding region on or about dielectric pad 76 extends closer to the leading end 84 of slider 44 than the weakening region 90 does. The bonding regions on or about dielectric pads 78 extend closer to the trailing end 86 of slider 44 than the weakening region 90 does. In this embodiment the weakening region 90 is a through-etched slot, but in another embodiment it could be a partially etched groove. In a preferred embodiment, the gimbal tongue 72 has an average width measured perpendicular to the length of slider 44, and weakening region 90 spans at least one third of that width.

It will be recognized that the exemplary embodiment described above accomplishes the objectives of the invention by carefully and selectively weakening the gimbal tongue 72 while maintaining a strong dispersed bond between gimbal tongue 72 and bonding surface 37 of slider 44, rather than merely confining or weakening the bond itself.

Figure 6:
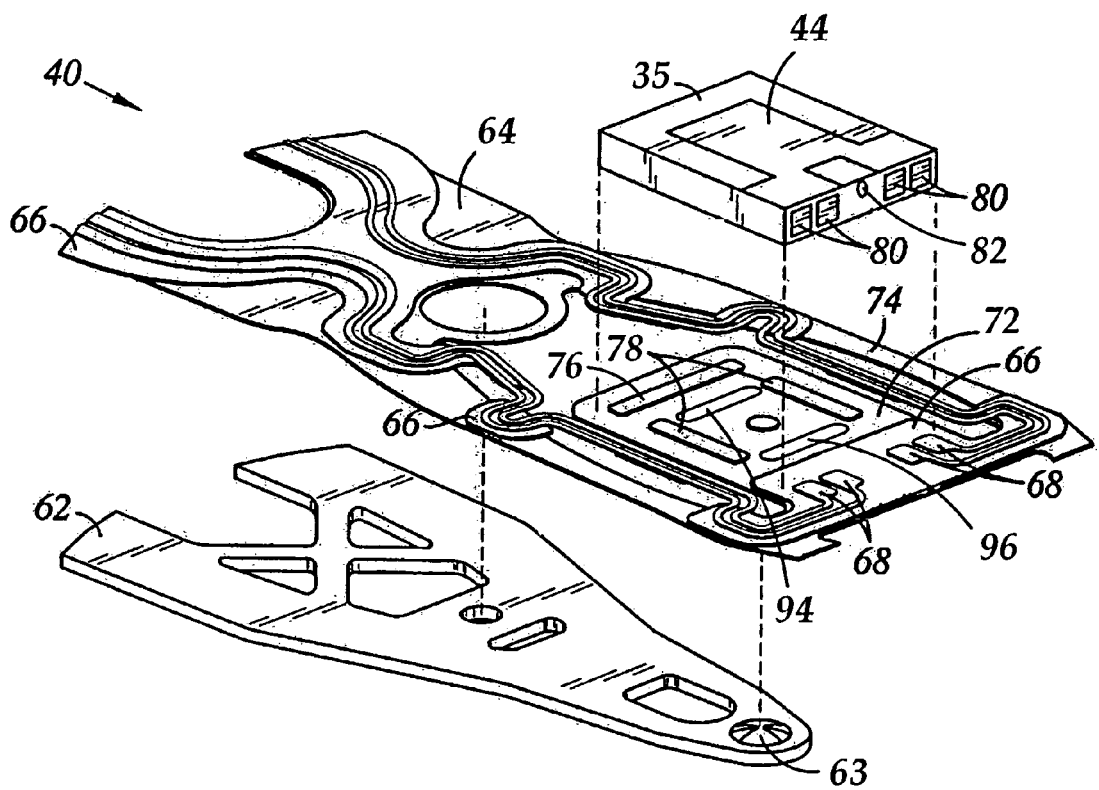
FIG. 6 is an enlarged exploded view of a portion of a head gimbal assembly as constructed in accordance with another exemplary embodiment of the present invention.
Figure 7:
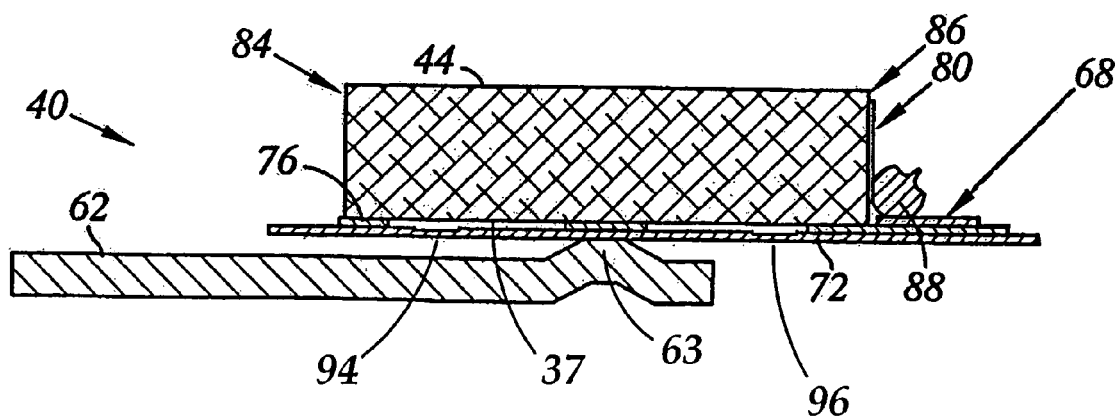
FIG. 7 is an enlarged side view of a portion of the head gimbal assembly of FIG. 6.

FIG. 6 is an enlarged exploded view of a portion of a head gimbal assembly as constructed in accordance with another exemplary embodiment of the present invention. FIG. 7 is an enlarged side view of a portion of the head gimbal assembly of FIG. 6. In this alternative embodiment, the gimbal tongue 72 includes weakening regions 94, 96, each of which extends more in a direction perpendicular to the length of slider 44 than in a direction parallel to the length of slider 44. The bonding region on or about dielectric pad 76 extends closer to the leading end 84 of slider 44 than weakening region 94 does. The bonding regions on or about dielectric pads 78 extend closer to the trailing end 86 of slider 44 than the weakening region 94 does. It is apparent from FIG. 7 that in this alternative embodiment the weakening regions 94, 96 are partially etched grooves. However, this is not apparent from FIG. 6 because of the approximate scale of the drawing and the thinness of the gimbal tongue 72 relative to its size. In another alternative embodiment, the weakening regions 94, 96 could be through-etched slots instead of partially etched grooves. In a preferred alternative embodiment, the gimbal tongue 72 has an average width measured perpendicular to the length of slider 44, and weakening region 94 spans at least one third of that width.

In the foregoing specification, the invention is described with reference to specific exemplary embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The terms "comprising," "including," and "having," as used herein, are specifically intended to be read as open-ended terms of art.

What is claimed is:

1. A head gimbal assembly, comprising:
   a slider having an air bearing surface opposite a bonding surface, the slider having a leading end and a trailing end separated by a length;
   a gimbal having a tongue including at least one weakening region that extends more in a direction perpendicular to said length than it does in a direction parallel to said length, the weakening region comprising a partially etched depression that does not extend completely through the thickness of the tongue, the tongue having a thickness that is less within the partially etched depression than outside of the partially etched depression;
   the bonding surface being attached to the tongue in a first bonding region that extends closer to said leading end than the weakening region does, and in a second bonding region that extends closer to said trailing end than the weakening region does, the bonding surface not being attached to the tongue in the weakening region.

2. The head gimbal assembly of claim 1 further comprising a first bonding agent in contact with the first bonding region and a second bonding agent in contact with the second bonding region.

3. The head gimbal assembly of claim 2 wherein both the first bonding agent and the second bonding agent comprise an adhesive material of the same composition.

4. The head gimbal assembly of claim 2 wherein the first bonding agent or the second bonding agent comprises an electrically conductive solder material or an electrically conductive adhesive material.

5. The head gimbal assembly of claim 1 wherein said tongue has an average width measured perpendicular to said length, and said at least one weakening region spans at least one third of said width.

6. The head gimbal assembly of claim 1 wherein said partially etched depression is a groove.

* * * * *